Patented Dec. 27, 1927.

1,653,710

UNITED STATES PATENT OFFICE.

JOHN COLBY KITCHIN, OF GRIDLEY, CALIFORNIA.

ANTIRODENT PREPARATION.

No Drawing.      Application filed October 27, 1925.   Serial No. 65,244.

This invention relates to a composition of matter and more particularly it relates to a preparation effective against the destructive action of rodents, such as mice and rats.

The preparation which I have invented may be employed in many ways for the purpose set forth, but a preferred method for its use comprises the application of it to receptacles which are to be protected and which may contain material also to be protected from rodents.

Material, such as grain, for example, is frequently put into bags and stored in warehouses for considerable time. If the filled bags remain in the warehouse during the breeding season of mice, the female mice chew up portions of the bags and make nests among the latter from the comminuted material. Obviously this is a loss to the owner of the material, since the cost of rebagging the grain or other material contained in the bags is expensive. Furthermore, portions of the grain or other contents of the bags which fall out of the same after the bag is partly destroyed may become contaminated by the mice, and some of it may be devoured. Such destruction of filled bags may be prevented by impregnating the bags with the preparation which I have invented, as such preparation is distasteful to rodents, such as mice and rats.

My invention is based in part on the observation that coffee or coffee grounds, or extracts thereof, are distasteful to rodents, such as mice and rats, and, therefore, the rodents do not infest coffee warehouses. I take advantage of this fact by applying to or impregnating containers with finely comminuted coffee beans or coffee grounds in any suitable known manner. It is not necessary that the coffee beans or coffee grounds themselves be employed, but a strong water extract of the same may be made and the containers which are to be treated may be dipped into one of the mentioned extracts, preferably the extract of coffee grounds, the extract of the grounds of coffee being more distasteful to the rodents than the extract of coffee.

Although coffee or coffee grounds, or extracts thereof, are effective as a preventive against the destructive action of rodents, I prefer to employ also in the preparation additional material. This additional material may be a poison which is preferably employed in small quantities. The additional material which I prefer to employ is cresol which is added to and thoroughly mixed with coffee or coffee grounds, or extracts thereof. If the cresol is to be added to a water extract of coffee or coffee grounds, it is desirable that a soap be also employed in order to effect a practical mixture of the cresol with the water extract.

An example of the preparation of my new composition of matter is as follows:

Four pounds of coffee grounds may be added to one gallon of water and the mixture boiled for two hours in order to make a strong solution. The mixture is then filtered, the grounds being discarded. To the filtrate is added five percent by weight of compound solution of cresol, the composition of which and the manner of making the same being well known and recorded in the U. S. Pharmacopoeia. This compound solution of cresol may be made by mixing five hundred grams of cresol with three hundred and fifty grams castor oil, which mixture is heated to 80° C. To the mixture of cresol and castor oil is added a hot solution consisting of eighty grams of potassium hydroxide dissolved in seventy milliliters of water. To the mixture of cresol, castor oil and solution of potassium hydroxide is added enough water to make up one thousand milliliters.

The mentioned preparation may be used in a number of devisable ways, but in the treatment of bags therewith, the material of which the bags are to be made may be impregnated with the solution by immersing it in the same, withdrawing from the preparation, pressing and drying the material and subsequently making it into bags.

It is to be understood that the proportions hereinbefore stated for making the preparation of this invention may be varied over wide limits, and that this invention is limited in its scope only by the appended claims.

I claim:

1. A porous container impregnated with an extract of coffee beans.

2. A porous container impregnated with an extract of coffee grounds.

3. A porous container impregnated with an extract of coffee grounds and a small percentage of cresol.

JOHN COLBY KITCHIN.